United States Patent
Stroebel

(10) Patent No.: US 11,106,202 B2
(45) Date of Patent: Aug. 31, 2021

(54) DRIVER ASSISTANCE SYSTEM FOR AT LEAST SEMI-AUTOMATICALLY COUPLING A TWO-TRACK MOTOR VEHICLE TO A TRAILER

(71) Applicant: Bayerische Motoren Werke Aktiengesellschaft, Munich (DE)

(72) Inventor: Michael Stroebel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 239 days.

(21) Appl. No.: 15/986,938

(22) Filed: May 23, 2018

(65) Prior Publication Data

US 2018/0341259 A1    Nov. 29, 2018

(30) Foreign Application Priority Data

May 29, 2017   (DE) ...................... 10 2017 208 991.1

(51) Int. Cl.
*B60W 30/06* (2006.01)
*G05D 1/00* (2006.01)
(Continued)

(52) U.S. Cl.
CPC ............. *G05D 1/0038* (2013.01); *B60D 1/36* (2013.01); *B60R 1/003* (2013.01); *B60W 30/06* (2013.01);
(Continued)

(58) Field of Classification Search
CPC .. G05D 1/0011; G05D 1/0016; G05D 1/0022; G05D 1/0033; G05D 1/0038;
(Continued)

(56) References Cited

U.S. PATENT DOCUMENTS 9,829,883 B1 * 11/2017 Lavoie ................. G05D 1/0016
2014/0297129 A1 * 10/2014 Lavoie .................. G01B 21/02
701/41
(Continued)

FOREIGN PATENT DOCUMENTS

DE    10 2010 008 324 A1    8/2011
DE    10 2012 207 648 A1    11/2013
DE    10 2014 110 498 A1    1/2016

OTHER PUBLICATIONS

German-language Search Report issued in counterpart German Application No. 10 2017 208 991.1 dated Feb. 7, 2018 with partial English translation (14 pages).

*Primary Examiner* — Spencer D Patton
(74) *Attorney, Agent, or Firm* — Crowell & Moring LLP

(57) ABSTRACT

A driver assistance system for at least semi-automatically coupling a two-track motor vehicle to a trailer has an electronic control unit. The system is configured to undertake the transverse guidance and/or the longitudinal guidance of the motor vehicle reversing toward the trailer, in particular by automatically adjusting an appropriate vehicle steering angle and/or by appropriate interventions in the drive and braking system of the motor vehicle, by evaluating signals of a vehicle-internal reversing camera. The control unit has a functional unit, which is configured, in particular by corresponding programming, such that the signals of a vehicle-external camera of a portable electronic mobile radio unit can be detected, and these signals can then be converted into the data form of the signals of a vehicle-internal reversing camera. A driver assistance system, which is designed for a vehicle having a reversing camera, can therefore be used even in a vehicle without a reversing camera or in the event of a faulty reversing camera.

17 Claims, 1 Drawing Sheet

(51) Int. Cl.
 *B62D 13/00* (2006.01)
 *B60D 1/36* (2006.01)
 *B60W 50/08* (2020.01)
 *B60R 1/00* (2006.01)

(52) U.S. Cl.
 CPC ............ *B60W 50/08* (2013.01); *B62D 13/00* (2013.01); *G05D 1/0016* (2013.01)

(58) Field of Classification Search
 CPC ........ G05D 1/0044; B60D 1/36; B60R 1/003; B62D 13/00; B62D 13/005; B60W 30/06; B60W 30/18036; B60W 2420/42; B60W 2420/403; B60W 2555/00; B60W 2556/45
 See application file for complete search history.

(56) References Cited

U.S. PATENT DOCUMENTS

2014/0358417 A1* 12/2014 Lavoie .................. B60K 35/00
 701/300
2015/0115571 A1* 4/2015 Zhang .................... H04N 7/183
 280/477

\* cited by examiner

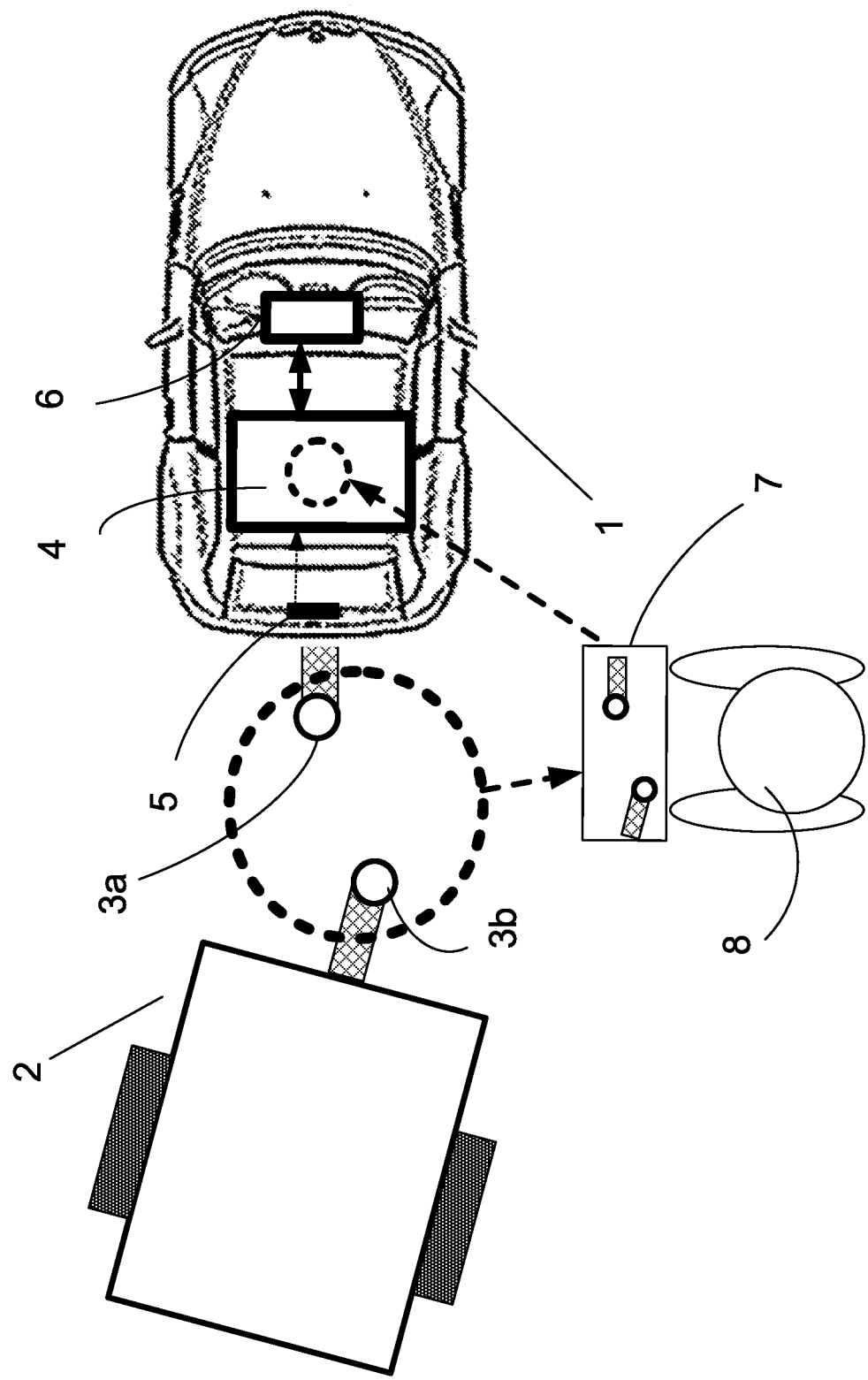

DRIVER ASSISTANCE SYSTEM FOR AT LEAST SEMI-AUTOMATICALLY COUPLING A TWO-TRACK MOTOR VEHICLE TO A TRAILER

CROSS REFERENCE TO RELATED APPLICATION

This application claims priority under 35 U.S.C. § 119 from German Patent Application No. 10 2017 208 991.1, filed May 29, 2017, the entire disclosure of which is herein expressly incorporated by reference.

BACKGROUND AND SUMMARY OF THE INVENTION

The invention relates to a driver assistance system for at least semi-automatically coupling a two-track motor vehicle to a trailer, which driver assistance system undertakes at least the longitudinal guidance and/or the transverse guidance of the motor vehicle reversing toward the trailer.

With respect to the prior art, reference is made, for example, to DE 10 2012 207 648 A1. According to this document, the position of the towbar point or trailer coupling of the trailer in relation to the trailer coupling of the motor vehicle can be determined by means of evaluation using a sensor apparatus. Depending on said position, when the motor vehicle reverses, the driver assistance system can undertake on the one hand the transverse guidance of the vehicle by virtue of the steering system thereof being adjusted in a controlled manner by way of an electronic control unit, preferably by way of the electric servomotor of the steering system in such a way that the trailer coupling of the motor vehicle is guided into that position in which it can be coupled to the trailer coupling of the trailer. On the other hand, the driver assistance system can also undertake the longitudinal guidance of the vehicle approaching the trailer by appropriate interventions in the drive system and braking system of the motor vehicle.

This known driver assistance system is used to ease the burden on the driver, and the motor vehicle can advantageously be brought not only into an exact target position but can also be brought to a standstill in exactly this position. This is easily possible in modern motor vehicles since they are already equipped with other systems that act on the longitudinal dynamics of the vehicle, that is to say that can accelerate the vehicle and brake the vehicle to a standstill. However, other systems known to those skilled in the respective relevant art can also be used for transverse guidance of the vehicle or for identifying a trajectory, which systems make it possible for the two trailer couplings to eventually assume the desired position with respect to one another.

It is possible to use ultrasonic sensors or vehicle-internal reversing (back-up) cameras as sensor devices for determining the position of the towbar point or the trailer coupling of the trailer in relation to the trailer coupling of the motor vehicle.

It is the object of the invention to improve such a driver assistance system for at least semi-automatically coupling a two-track motor vehicle to a trailer in terms of convenience, costs and availability.

This and other objects are achieved according to the invention by a by way of driver assistance system for at least semi-automatically coupling a two-track motor vehicle to a trailer. The driver assistance system includes an electronic control unit, which is configured to undertake the transverse guidance and/or the longitudinal guidance of the motor vehicle reversing toward the trailer, in particular by automatically adjusting an appropriate vehicle steering angle and/or by appropriate interventions in the drive and braking system of the motor vehicle, by evaluating the signals of a vehicle-internal reversing camera.

The control unit itself comprises a functional unit, which is configured, in particular by corresponding programming, in such a way that the signals of a vehicle-external camera of a portable electronic mobile radio unit can be detected. These signals can then be converted into the data form of the signals of a vehicle-internal reversing camera.

A driver assistance system, which is designed for a vehicle having a reversing camera, can therefore be used even in a vehicle without a reversing camera.

The functional unit can preferably be activated by the control unit when the motor vehicle is not equipped with a reversing camera or when the vehicle-internal reversing camera is not operational. Alternatively or in addition, the functional unit can be activated by the portable electronic mobile radio unit (for example extended radio keys or a mobile radio telephone with a corresponding app) when said mobile radio unit transmits the signals of the vehicle-external camera or another defined activation command.

The invention is based on the following considerations.

The invention proceeds from driver assistance systems mentioned above, in particular trailer maneuver assistance systems. These systems align the trailer ball of the trailer coupling of a motor vehicle (towing vehicle) beneath the towbar point of the trailer in order that the driver can couple them directly. The coupling head is preferably identified by way of a reversing camera.

In the known systems, the driver has to be located in the vehicle in order to monitor the maneuver by way of a display unit. Where appropriate, a guide is required. Furthermore, the installation of a reversing camera, which is associated with costs and structural complexity, is required.

In accordance with the invention, the driver can cause the towing vehicle to align automatically with respect to the trailer while being outside of the vehicle by way of an operator part of a mobile radio unit (for example, a smartphone, keys, etc.). If a reversing camera is not installed or if it is faulty, a photo or video of the situation can be generated in accordance with the invention by way of the camera of the mobile radio unit, in particular by use of the camera of a smartphone with an appropriate app. By subsequent transmission to the vehicle-internal control unit of the driver assistance system and by subsequent evaluation of the external camera data, the distances and positions of the trailer coupling components can then be identified as if they would have been detected from signals of a reversing camera.

The costs of a reversing camera can therefore be saved. The availability in present but faulty reversing cameras can also be increased.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE schematically illustrates an exemplary embodiment of the invention showing an overall situation, in which the invention can be applied in an advantageous manner for a vehicle-trailer unit.

DETAILED DESCRIPTION OF THE DRAWING

The single FIGURE illustrates a vehicle-trailer unit, which is to be coupled and which consists of a motor vehicle 1 (towing vehicle) and a trailer 2. The trailer 2 has a trailer coupling component 3b (towbar point). The motor vehicle 1, as the towing vehicle, has a trailer coupling component 3a (coupling head). The towing vehicle 1 is equipped with the driver assistance system according to the invention in the form of a trailer maneuver assistance system. To this end, the towing vehicle 1 has, in particular, an electronic control unit 4, but, where appropriate, not necessarily a reversing (back-up) camera 5, and preferably a display unit 6.

In the case of a reversing camera 5 being present, the towing vehicle 1 could be coupled to the trailer 2 in a manner known per se by appropriately configuring the control unit 4 for transverse guidance and/or longitudinal guidance of the motor vehicle backing up toward the trailer, in particular by automatically adjusting an appropriate vehicle steering angle and/or by appropriate interventions in the drive and braking system of the motor vehicle. This is done by evaluating the signals of the vehicle-internal reversing camera 5 and by monitoring the operation by means of the display unit 6. The signals of the vehicle-internal camera 5 are processed in the control unit 4 in a defined data form for this purpose.

In order to utilize said data form when the reversing camera 5 is not present, substitute data, which are detected by the signals of an alternative camera of a mobile radio unit 7 that can be carried by a person 8 and are transmitted from the mobile radio unit 7 to the control unit 4, are converted to said data form in accordance with the invention. This data form also comprises, for example, the alignment of an image in the coordinate system in the way in which a reversing camera 5 would record it. In the example illustrated, the image would have to be converted, in particular, into a data form of an image rotated by approximately 90°.

The at least semi-automatic coupling can then be performed in such a way as if the image were recorded by a vehicle internal reversing camera 5.

The term "at least semi-automatic" coupling or driving of the towing vehicle can be understood in the scope of the document to mean, in particular, driving with automatic longitudinal or transverse guidance or autonomous driving using fully automated longitudinal and transverse guidance. The term automatic driving comprises automated driving with any desired degree of automation. Exemplary degrees of automation are assisted, semi-automated, highly automated or fully automated, or autonomous, driving. These degrees of automation have been defined, for example, by the Bundesanstalt für Straßenwesen (BASt) (Federal Highway Research Institute).

To further increase the convenience as well, a driver assistance system according to the invention can thus be activated by a person located outside of the motor vehicle. The positioning of the motor vehicle in a target position, in which the trailer coupling of the trailer to that of the vehicle can be coupled, can therefore be initiated from outside of the vehicle. If a driver wishes to couple a parked trailer to his motor vehicle, he has to bring the vehicle closer to the trailer by only a short distance and can then get out of the vehicle, for example to prepare the trailer coupling of the trailer. The driver can then start the exact positioning of the motor vehicle by way of the driver assistance system according to the invention using an appropriate remote control or mobile radio device, which may preferably be integrated in his vehicle key or in his mobile radio telephone as a special loadable program (app), in order, eventually, to connect the two trailer couplings to one another straightaway when the vehicle has come to a standstill in the target position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driver assistance system for at least semi-automatically coupling a two-track motor vehicle to a trailer, said system being configured to undertake in automated fashion transverse and/or longitudinal guidance of the motor vehicle reversing toward the trailer via evaluation of signals of a vehicle-internal reversing camera, the system comprising:
   an electronic control unit of the motor vehicle, the electronic control unit being operatively configured to:
      be activated by a portable electronic mobile radio unit when said portable electronic mobile radio unit transmits signals of a vehicle-external camera;
      detect the signals of the vehicle-external camera of the portable electronic mobile radio unit,
      convert the detected signals into a data form of the signals of the vehicle-internal reversing camera.

2. The driver assistance system according to claim 1, wherein
   the electronic control unit is activatable when the motor vehicle is either not equipped with the vehicle-internal reversing camera or when the vehicle-internal reversing camera is not operational.

3. A motor vehicle comprising a driver assistance system according to claim 1.

4. The driver assistance system according to claim 1, wherein the converted signals produce a different view than a view captured by the vehicle-external camera of the portable electronic mobile radio unit.

5. The driver assistance system according to claim 4, further comprising:
   a display device, wherein
   the motor vehicle is devoid of a reversing camera, and the different view is displayed on the display device.

6. The driver assistance system according to claim 1, wherein the detected signals are converted by orientation.

7. The driver assistance system according to claim 1, wherein the portable electronic mobile radio unit is also configured to activate a driver assistance system of the two-track motor vehicle.

8. The driver assistance system according to claim 1, wherein the detected signals are converted by aligning captured images in a coordinate system of the vehicle-internal reversing camera.

9. The driver assistance system according to claim 1, wherein the portable electronic mobile radio unit generates an activation command that activates the electronic control unit of the motor vehicle.

10. An apparatus of a motor vehicle, comprising:
    an electronic control unit, which executes a program to:
       receive signals from a vehicle-external camera of a portable electronic mobile radio unit;
       convert the received signals into a data form of signals of a vehicle-internal reversing camera; and use the data form of the converted signals to undertake in automated fashion a transverse and/or longitudinal guidance of the motor vehicle reversing toward a trailer, wherein
the electronic control unit is configured to be activated by the portable electronic mobile radio unit when said portable electronic mobile radio unit transmits the signals of the vehicle-external camera.

11. The apparatus according to claim 10 wherein the received signals are converted by rotating their orientation by 90°.

12. The apparatus according to claim 11, wherein the portable electronic mobile radio unit is also configured to activate a driver assistance system of the motor vehicle.

13. The apparatus according to claim 12, wherein the detected signals are converted by aligning captured images in a coordinate system of the vehicle-internal reversing camera.

14. A method for at least semi-automatically coupling a two-track motor vehicle to a trailer, the motor vehicle having a driver assistance system configured to undertake in an automated fashion transverse and/or longitudinal guidance of the motor vehicle reversing toward the trailer by evaluating signals of a vehicle-internal reversing camera, the method comprising the acts of:

activating an electronic control unit of the two-track motor vehicle using a portable electronic mobile radio unit when said portable electronic mobile radio unit transmits signals of a vehicle-external camera;

receiving, in the electronic control unit of the motor vehicle, the signals from the vehicle-external camera of the portable electronic mobile radio unit;

converting the received signals into a data form of the signals of the vehicle-internal reversing camera; and using the data form of the converted signals to undertake in the automated fashion the transverse and/or longitudinal guidance of the motor vehicle reversing toward the trailer.

15. The method according to claim 14, wherein the received signals are converted by rotating their orientation by 90°.

16. The method according to claim 14, wherein the portable electronic mobile radio unit is also configured to activate a driver assistance system of the two-track motor vehicle.

17. The method according to claim 14, wherein the detected signals are converted by aligning captured images in a coordinate system of the vehicle-internal reversing camera.

* * * * *